United States Patent [19]
Shafe'

[11] Patent Number: 5,701,219
[45] Date of Patent: Dec. 23, 1997

[54] SPACER FOR PROVIDING SUPPORT AND A TRANSDUCER PARKING STRUCTURE IN A DISK DRIVE ASSEMBLY

[75] Inventor: Mathew Kayhan Shafe', Campbell, Calif.

[73] Assignee: International Business Machines, Armonk, N.Y.

[21] Appl. No.: 689,750

[22] Filed: Aug. 13, 1996

Related U.S. Application Data

[62] Division of Ser. No. 363,463, Dec. 23, 1994, Pat. No. 5,590,006.

[51] Int. Cl.⁶ ..................................................... G11B 5/54
[52] U.S. Cl. ........................................................... 360/105
[58] Field of Search ............................ 360/97.01, 98.01, 360/103–106

[56] References Cited

U.S. PATENT DOCUMENTS 5,241,438  8/1993  Matsushima ........................... 360/105
5,526,206  6/1996  Shimizu .................................. 360/105

FOREIGN PATENT DOCUMENTS 2-203482  8/1990  Japan ..................................... 360/105
5-135526  6/1993  Japan ..................................... 360/105

*Primary Examiner*—Jefferson Evans
*Attorney, Agent, or Firm*—Monica D. Lee; Ingrid M. Foerster

[57] ABSTRACT

A spacer structure is proposed, including a transducer parking structure, for use in a disk drive assembly including a housing, a rotatable disk, and an actuator assembly for positioning a transducer relative to the rotating disk. In the preferred embodiment, the spacer structure is adapted for contact with, or ridged mounting to, the housing of a disk drive over a disk. The spacer structure may be further adapted for making contact with the disk surface, e.g. by the provision of a cone-like or needle-like protrusion. The point of contact is preferably made at a substantially planar region at the center of the disk. The planar region may form a part of the spacer structure, and may be coated, textured, or smooth. It may also be stationary with respect to the rotating disk, or may rotate with the disk, enabling the spacer structure to be rigidly affixed. The parking structure may be a recess or cavity, a ramp, a step, or a combination of these structures. The ramp may be adapted to engage a transducer-supporting suspension of the disk drive actuator assembly.

28 Claims, 8 Drawing Sheets

SPACER FOR PROVIDING SUPPORT AND A TRANSDUCER PARKING STRUCTURE IN A DISK DRIVE ASSEMBLY

The present application is a divisional of application Ser. No. 08/363,463, filed on Dec. 23, 1994, now U.S. Pat. No. 5,590,006.

FIELD OF THE INVENTION

The present invention relates generally to disk storage devices and in particular to structures provided in a disk drive to provide structural support to the disk drive and facilitate parking of a transducer during periods of inactivity.

BACKGROUND OF THE INVENTION

Small form factor disk drives are growing in commercial importance as they assume the functions of larger, costlier, high performance direct access storage devices (DASD). As drive size continues to decrease, they are also becoming practical for a number of other applications requiring information storage. A small form factor disk drive generally includes one or more disks, each having a pair of recording surfaces for storing information. Information is accessed and retrieved from each recording surface with a transducer. The data capacity of the drive is determined by the number of recording surfaces available for user data, and the amount of data that can be stored on each data recording surface.

A number of small form factor drives are currently available with disk diameters typically ranging from 5¼" to 1.3" in diameter. Many of these are available in enclosures meeting industry standard form factors and functional interface requirements to easily accommodate a variety of different applications. For example, IBM Corporation offers a 1.6" high 3½" form factor disk drive having two stacked disks, magnetoresistive heads enabling high areal densities, and a data capacity of 8.7–10.8 gigabits. Versions are available with industry standard SCSI (small computer system interface) and SSA (serial storage architecture). The product is suitable for applications requiring high data capacities, e.g. multimedia systems or array subsystems emulating larger high performance DASD. At the other end of the spectrum, Hewlett Packard's 1.3", 20–40 MB, single-platter Kittyhawk drive targets applications with small storage requirements, such as the palmtop, fax machine, cellular phone and printer markets.

A variety of applications exist wherein drive height is a primary concern and data capacity is secondary. For example, an emerging industry standard is the credit card-sized PCMCIA type form factor established by the Personal Computer Memory Card Industry Association. The standard was introduced to encourage development of thin, multi-application memory cartridges compatible with PCMCIA-defined computer slots. It has therefore become an objective of a number of competing disk drive manufacturers to provide low profile disk drives meeting these form factor requirements. Three PCMCIA form factor types have presently been defined. Type III card measures 10.5 mm in height, 85.6 mm in length and 54 mm in width. The dimensions of a type II card are approximately 5 mm high×86 mm long×54 mm wide. A type I card is a modest 2.5 mm h×85.6 mm l×54 mm w.

An essential requirement of small form factor disk drives is the ability to withstand external shock and compression forces occurring, for example, during movement or operation, as discussed in an article entitled "Improved Low Power Modes Highlight 1.8-in. Drives". Richard Nass, Electronic Design, Apr. 18, 1994, pp. 47–54, p. 48. External shock may cause the sliders to slam into the data surfaces, resulting in damage to the disk or and the delicate read/write elements, as well as the loss of data. To avoid this risk, most disk drive designs employ a method for "parking" the suspension and head in a safe place during periods of inactivity.

U.S. Pat. No. 5,231,549 discloses a method for loading each head onto a ramp located at the outer diameter of the recording surface. A problem with this approach, however, is that the largest outer diameter data tracks are sacrificed to allow the overhang of the ramp. The design also requires either a slightly larger hard disk enclosure or special positioning of the actuator pivot to accommodate the ramp, making it less suitable for low profile form factors. In addition, the design requires a specially adapted suspension, e.g. a tab or load/unload rod appended to the suspension beam.

An alternative design provides a "landing zone", or region not used for data storage, at the inner diameter (ID) of the disk. For instance, U.S. Pat. Nos. 5,291,355 and 5,313,350 disclose single-platter disk drives equipped with a mechanical latching mechanism on the actuator for securing the heads at the innermost track of the disk. U.S. Pat. No. 5,025,355 describes the use of a magnetic field to capture the actuator arm and park the heads at the desired zone. Other applications provide a textured landing zone to minimize friction between the parked head and disk substrate. See, for example, anonymously submitted research disclosure "Head Parking Zone", RD29563 November 1988 N. 295. Texturing reduces the amount of torque required to "unpark" the head, i.e. to break the slider free of the landing zone.

Parking at the ID is desirable because the data tracks are small, and loss of their use only minimally impacts a disk's data capacity. It would be even more desirable to park the head at the center of the disk, where tracks would be too small for practical use. Most disk drive designs preclude center parking, since a spindle hub occupies the center region.

SUMMARY OF THE INVENTION

A primary objective of the present invention is to provide a parking structure for use in a disk drive assembly, whereby damage to the transducer is prevented during periods of inactivity when the disk drive is subjected to external shock.

A further object of the present invention is to provide a spacer structure for providing structural support against external forces pressing down on the housing of the disk drive.

Another object of the present invention is to provide a parking structure suitable for use in low profile, shock resistant, small form factor disk drives.

Accordingly, the present invention is a spacer structure, including a transducer parking structure, for use in a disk drive assembly including a housing, a rotatable disk, and an actuator assembly for positioning a transducer relative to the rotating disk. In the preferred embodiment, the spacer structure is adapted for contact with, or ridged mounting to, the housing of a disk drive over a disk. The spacer structure may be further adapted for making contact with the disk surface, e.g. by the provision of a cone-like or needle-like protrusion. The point of contact is preferably made at a substantially planar region at the center of the disk. The planar region may form a part of the spacer structure, and may be coated, textured, or smooth. It may also be stationary with respect to the rotating disk, or may rotate with the disk, enabling the spacer structure to be rigidly affixed. The parking structure may be a recess or cavity, a ramp, a step, or a combination of these structures. The ramp may be adapted to engage a transducer-supporting suspension of the disk drive actuator assembly. The ideal disk drive assembly for implementing the described spacer structure has one of several forms, each including a disk with a planar region at its center suitable for center-parking of the transducer. The planar region according to a first implementation is a stationary structure at the disk center. Alternatively, it is a rotating hub. In a third implementation, a disk having a single data surface is mounted on a flat motor, eliminating the need for a hub. In each implementation, it is desirable to mount the spacer structure on the drive enclosure above the disk's center to facilitate center-parking.

BRIEF DESCRIPTION OF THE DRAWING

The foregoing and other objects, features and advantages of the present invention will be apparent from the following detailed description of the preferred embodiments, and from the accompanying figures of the drawing.

DESCRIPTION OF THE PREFERRED EMBODIMENT

Figure 1A:
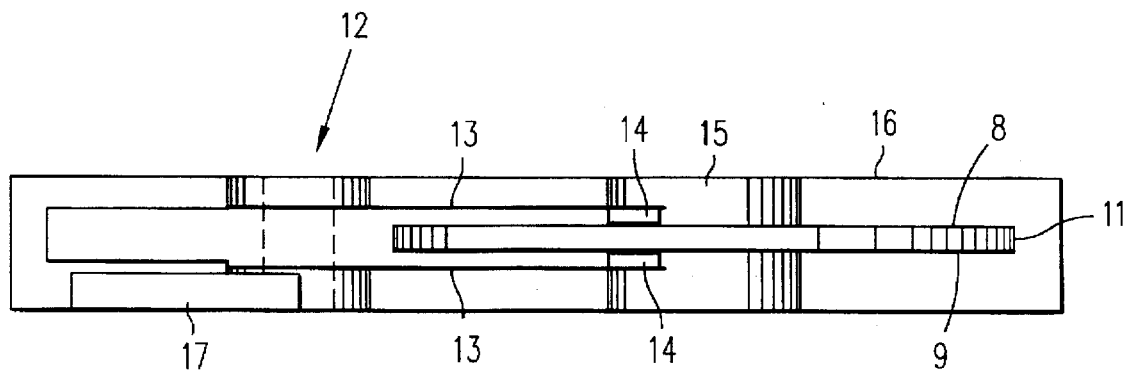
FIGS. 1A and 1B show a known disk drive including two recording surfaces and two suspensions.
Figure 1B:
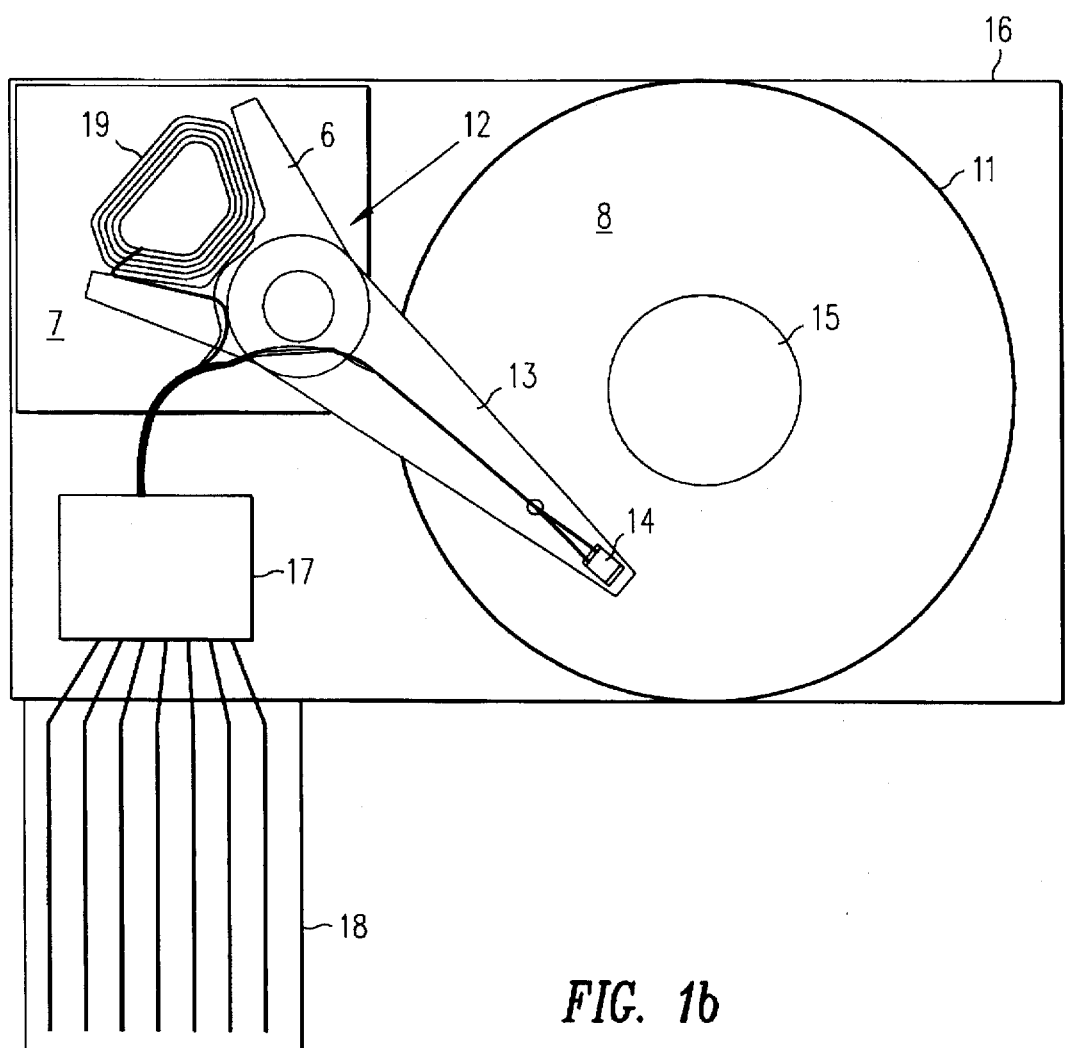

FIGS. 1A and 1B are illustrations of a known disk drive comprising a single disk or platter 11 connected to a hub 15, a motor (not shown), an actuator assembly 12, arm electronics 17, and a housing 16. The disk 11 includes two recording surfaces 8,9.

As is known in the art, the actuator assembly 12 generally comprises a voice coil motor (VCM), an actuator arm 6, and a pair of suspensions 13 connected to the arm 6 and supporting a pair of air bearing sliders 14 over respective recording surfaces 8,9 of the disk 11. One or more transducers or read/write heads are located on each slider 14, and are held in close proximity to the disk surface by the combination of a downward force (relative to the disk surface) from the suspension 13 and an upward force caused by air flow generated from the rotation of the disk 11. If the downward force exceeds the upward force, the slider will come into contact with the disk surface.

The VCM is the moving mechanism of the actuator assembly and comprises an inductive coil 19 disposed between an upper magnet (not shown) and a lower magnetic plate 7. The arm electronics 17 transmits electrical positioning current to the coil 19. The signals induce a changing magnetic flux for repulsing and attracting the magnet and magnetic plate 7. The repulsing and attracting forces provide movement of the actuator arm in a plane parallel to the disk surface, causing the suspensions 13 to move along an arcuate path.

Data is generally recorded on concentric tracks of the recording surfaces 8,9. The disk region or track having the largest diameter is referred to as the outer diameter (OD) of the disk, and the region or track nearest to the hub and having the smallest diameter is referred to as the inner diameter (ID). Data to be stored on the disk 11 is first "encoded" by a read/write channel (not shown) residing within or external to the disk drive housing 16. The data is encoded into a form suitable for the storage medium, then transmitted via the arm electronics 17 to the transducer for writing to the disk. For example, in a magnetic disk drive, digital data is encoded into a series of pulses. As is known in the art, the pulses are transmitted in the form of a current to the transducer, and cause a fluctuating magnetic field at the transducer pole tip that affects the magnetization of discrete regions on the disk surface. When a transducer senses or "reads" information from the disk, the data is transmitted in encoded form via the arm electronics 17 to the channel for "decoding". The arm electronics usually include means for amplifying and synchronizing the read signal.

The hub 15 is fixedly attached to the disk 11 and encases a motor (not shown) for providing a rotational force. The rotational force is translated to the hub 15 and from the hub 15 to the disk 11. The hub generally protrudes from the upper surface of the disk as shown in FIG. 1A, preventing the suspension/head assembly from access to the region at the center of the disk.

Figure 2:
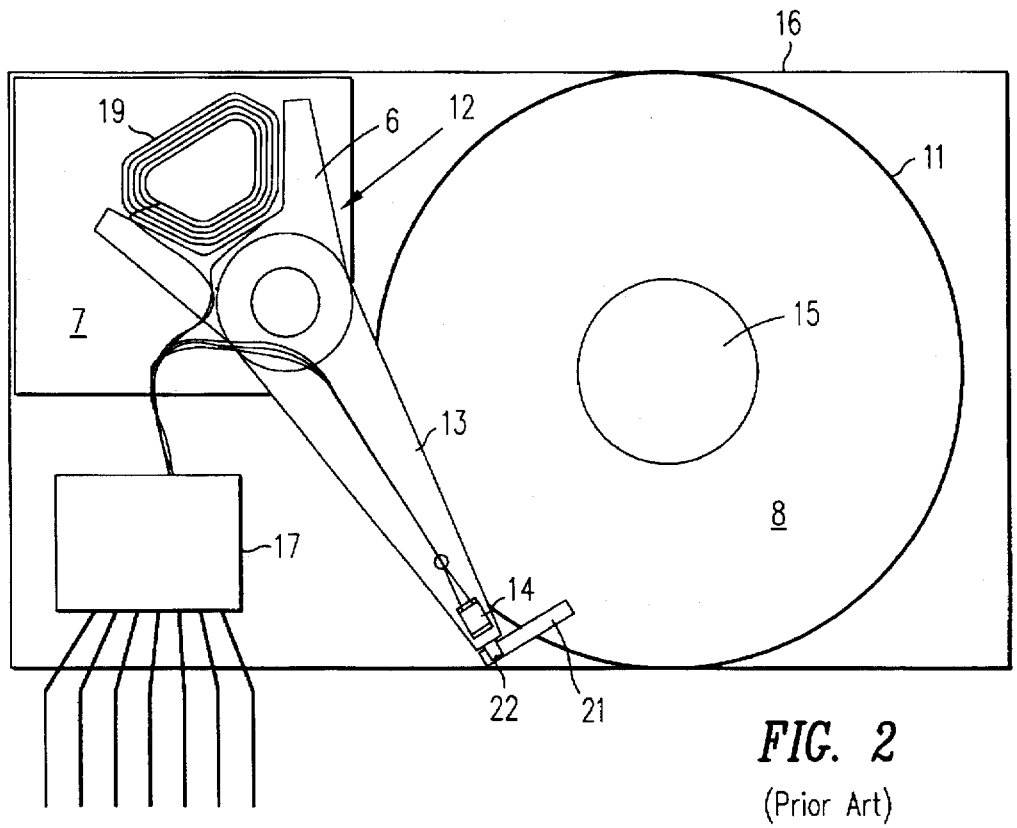
FIG. 2 shows a known disk drive having an outer load/unload ramp for head parking.

To protect a rotary disk drive from external forces during operation or movement, means may be implemented to park the head when the disk is not operating and/or during periods of inactivity (i.e. times when data is not being written to or retrieved from the disk). FIG. 2 shows a disk drive including a presently known outer diameter load/unload ramp 21. During periods of inactivity, the actuator assembly 12 moves the suspension 13 toward the outer diameter and onto the ramp 21, where it remains "parked" until further disk access is required. While on the ramp 21, the slider 14 is protected from slamming into the disk, protecting the slider 14, head and disk 11 from permanent damage. The suspension 13 is usually adapted in some manner to engage the ramp 21, e.g. it may include a special tab 22, as shown, or a rod extended from the portion of the suspension nearest to the actuator arm 6.

Figure 3:
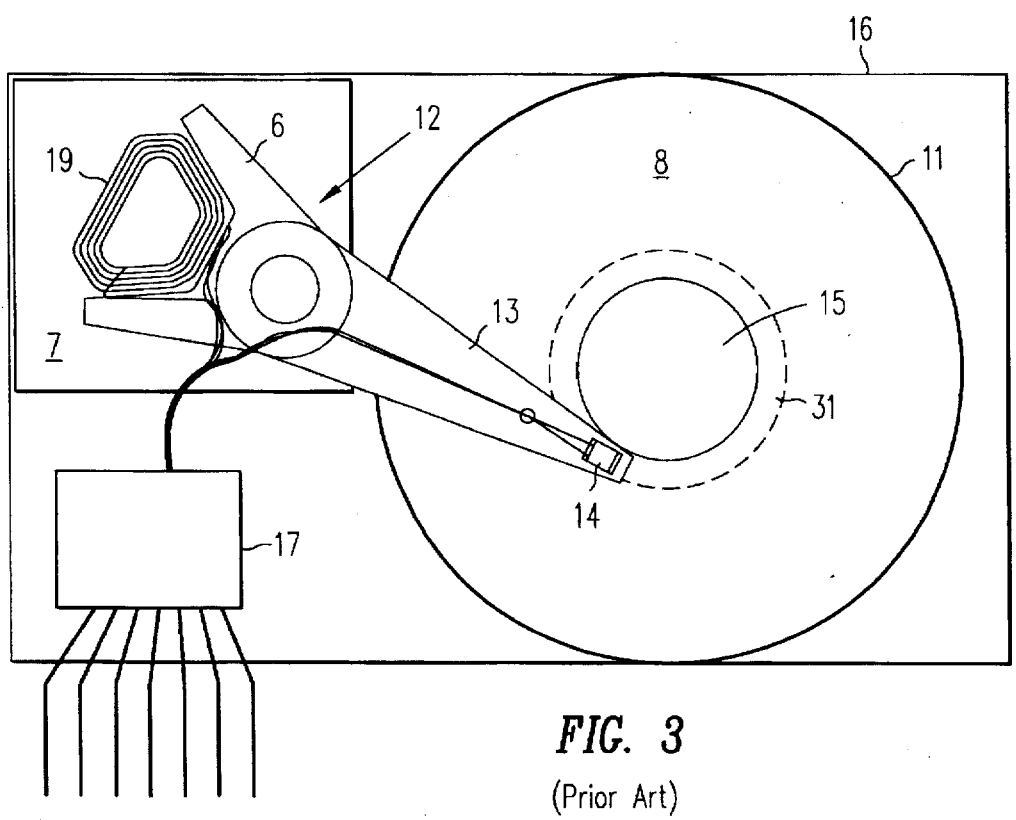
FIG. 3 is a known disk drive with a parking zone at the inner diameter.

FIG. 3 illustrates an alternative known parking arrangement wherein a region is reserved at the inner diameter of the disk proximate to the hub 15. During periods of activity, the suspension moves toward the inner diameter of the disk 11. The upward force of the airflow lessens approaching the ID and is eventually overcome by a combination of the downward force of the suspension 13 and an attractive force between the slider 14 and the disk surface 8. The slider is parked on the disk surface within this "landing zone" 31. To "unpark" the slider, the drive motor must provide sufficient force to overcome "stiction", i.e. the attractive and frictional forces between slider 14 and surface 8. It is greatest at the outer diameter of the disk and decreases in the direction of the disk center, being essentially reduced to zero at dead center. Stiction is minimized by locating the parking zone 31 as close to the center of the disk as possible. Note that the protrusion of hub 15 defines the inner limit of this zone 31. Stiction may be further reduced by roughening the surface of the parking zone 31, e.g. by forming concentric grooves that provide fewer points of contact between the slider 14 and surface 8 than a smooth surface.

Figure 4A:
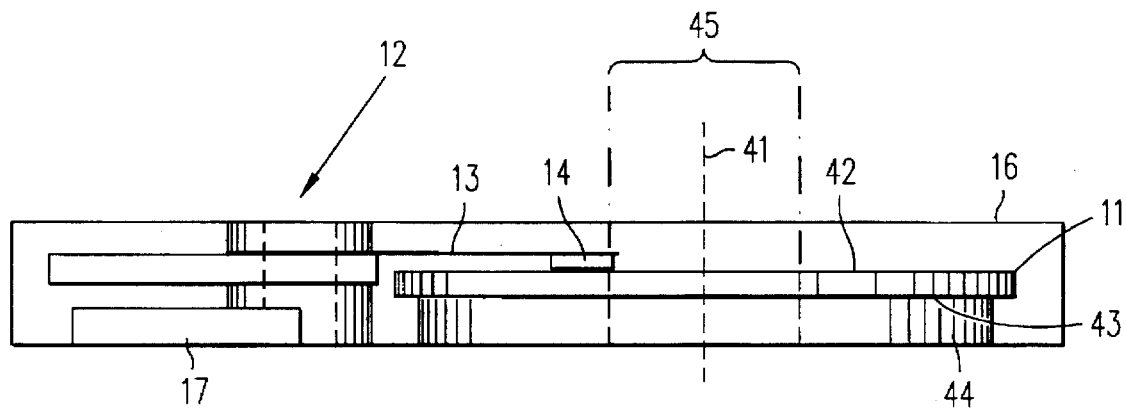
FIGS. 4A and 4B show side and top views of a disk drive design suitable for implementing center parking according to the present invention.
Figure 4B:
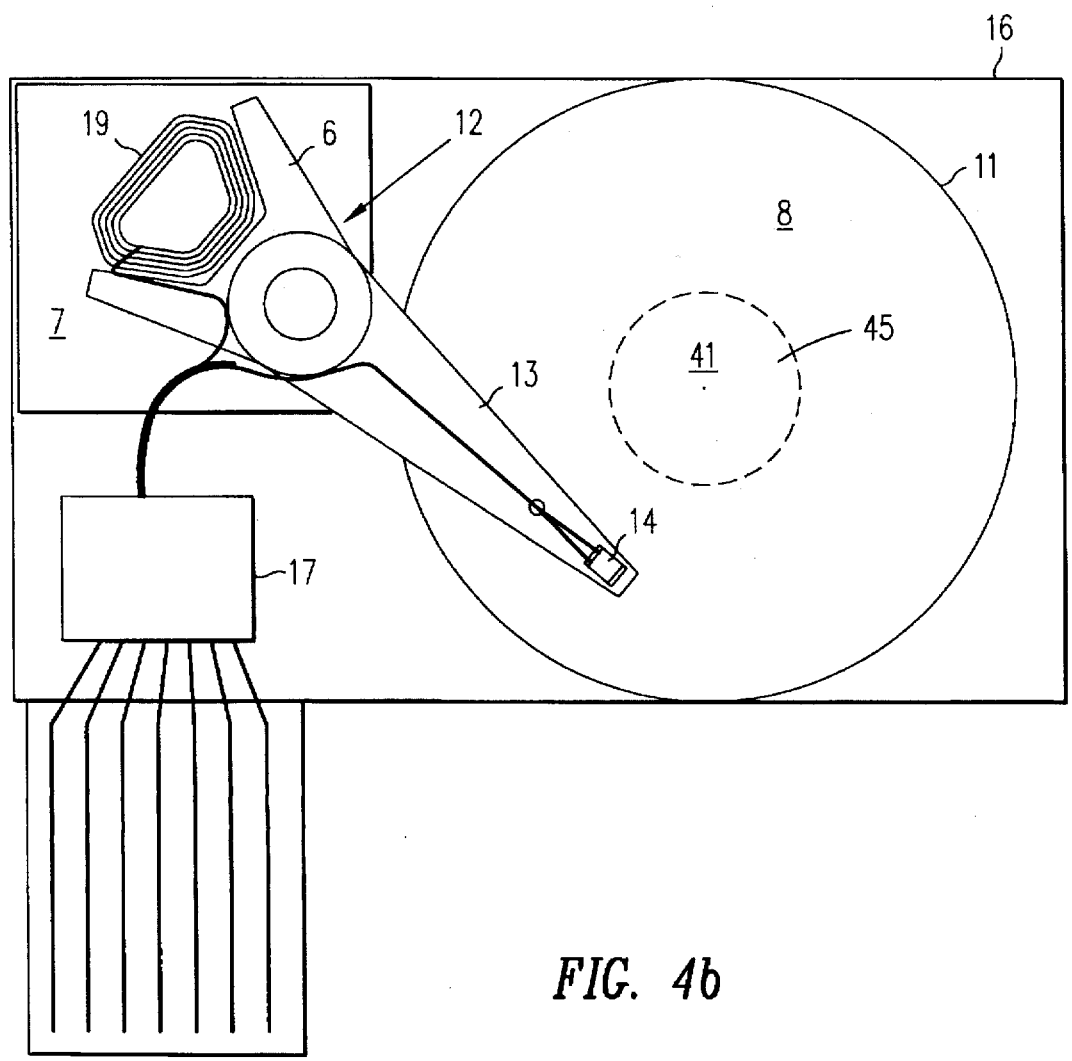

FIGS. 4A and 4B show the preferred embodiment of a disk drive assembly suitable for implementing the proposed center-parking structures of the present invention. The drive comprises a disk 11, a motor 44, an actuator assembly 12, arm electronics 17, and a housing 16. The disk 11 is preferably magnetic and includes one recording surface 42. It is mounted directly to a flat motor 44 along its nonrecording surface by some appropriate means, e.g. mechanically, or by applying a bonding agent along interface 43. The disk either does not include a center hole or has a very small hole at disk center in this embodiment. Direct platter mounting eliminates the need for a hub, allowing a wider, thinner motor assembly than would be appropriate for rotating a disk with two recording surfaces. Elimination of the hub offers the additional advantages of a lower disk height, a reduced number of drive components and the possibility of integrating the magnetic disk into the motor bearing assembly itself, thereby simplifying the assembly process.

The actuator assembly comprises a voice coil motor, an actuator arm 6, a single suspension 13 and a transducer-bearing slider 14. Preferably, the slider carries a magnetoresistive (MR) head for greater data capacity. Magnetoresistive heads are known in the disk drive industry and are preferred because their high sensitivity enables greater areal density (i.e. bits per inch) than conventional inductive heads. Using a state of the art magnetoresistive head in the preferred embodiment provides useful data storage capacity for applications requiring moderate data storage. However, it will be understood that an inductive head may also be used in the present invention. Moreover, the invention may easily be adapted for a plurality of heads per slider and a plurality of sliders on suspension 13. The actuator assembly 12 preferably has a low profile height since it only has to access a single disk surface 8.

Direct mounting of disk 11 to motor 44 creates an unobstructed region 45 at the disk's center 41 accessible to the actuator assembly 12. The diameter of recording tracks in this region would be too small for practical use, so the region is used for providing center parking features according to the present invention.

Figure 5A:
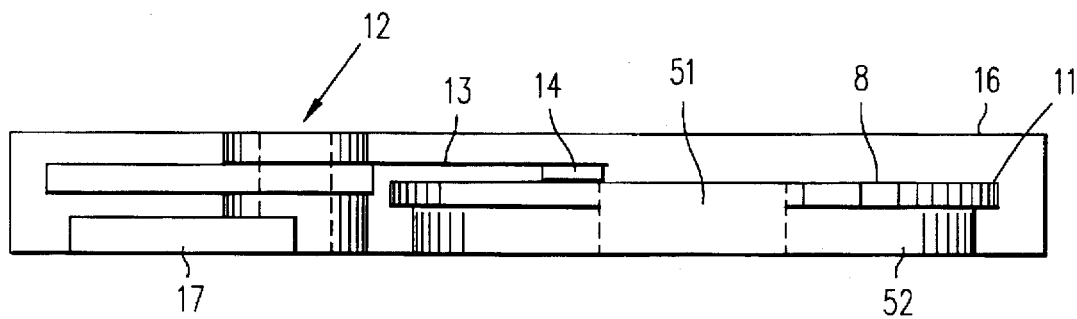
FIGS. 5A and 5B are side and top views of an alternative disk drive design suitable for implementing center parking according to the present invention.
Figure 5B:
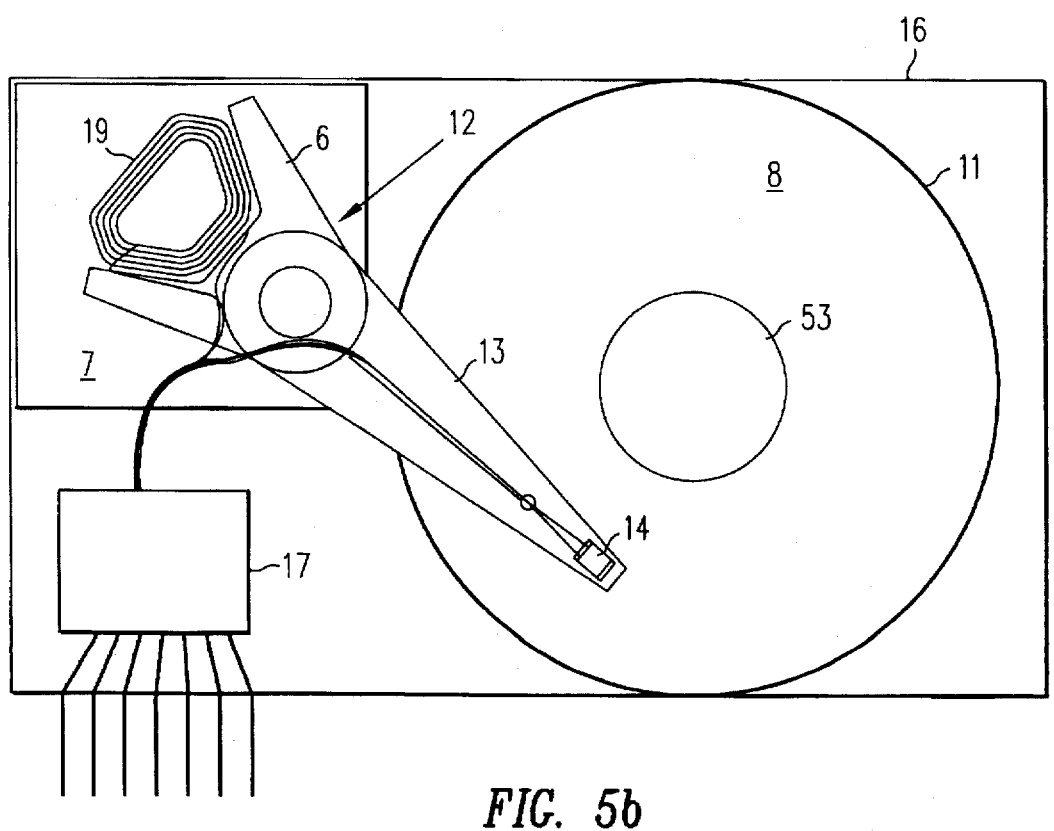

FIGS. 5A and 5B show an alternative disk drive design for implementing center-parking structures, including a rotating hub or stationary hub structure 51 flush with the recording surface of disk 11. For example, a ring-shaped motor 52 is directly coupled to disk 11, and an independent, stationary structure 51 is provided at the motor's center. Alternatively, a hub encloses or rests on a motor to provide a rotating central region 53.

The planar region may include a number of features for facilitating or forming a part of the proposed spacer structure. For example, a coating of nonstick material applied to the center disk region 45 or 53. The coating is formed of a material that is not prone to generate debris, e.g. steel. Additionally, the material is selected to prevent the slider from sticking to the disk surface and may also provide shock damping. Alternatively, the center region 45 or 53 is roughened, e.g., by forming a plurality of concentric grooves in the disk material by a suitable process such as mechanical etching or laser ablation. Conversely, center region 45 or 53 may be smoothed to increase stiction at the disk center, as an aid for keeping the slider parked. In yet another design, the hub is made of material that softens shock on the slider 14. Special plastics, e.g. nylon, can be molded into shape for this function.

Figure 6A:
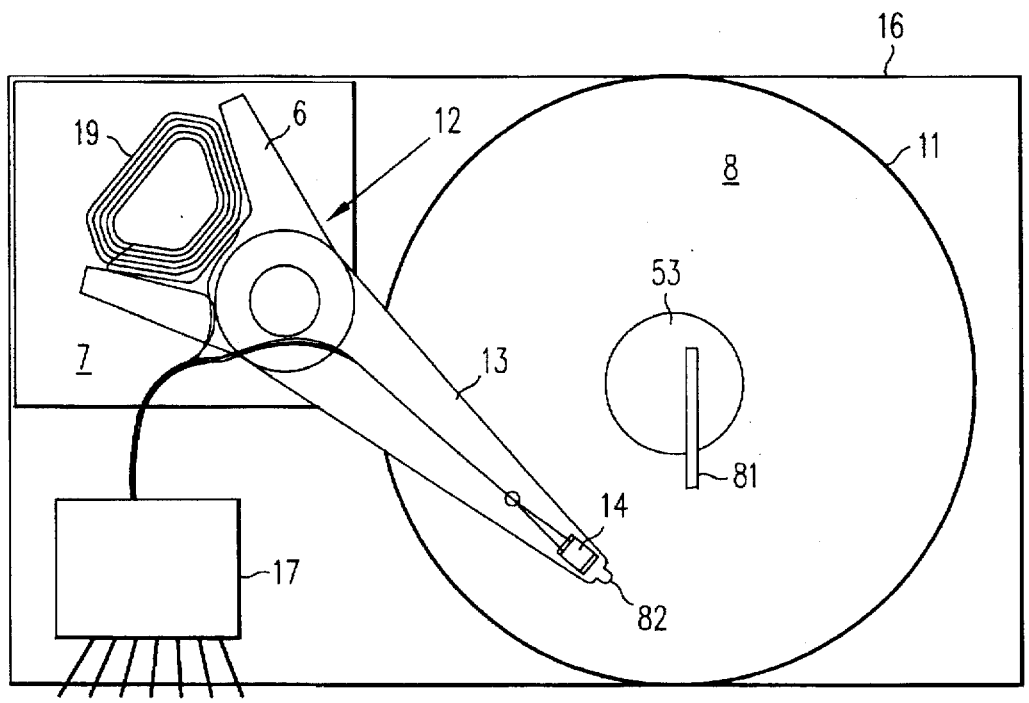
FIGS. 6A and 6B are top views of the disk drive of FIGS. 5A-5B including a load/unload ramp at the center hub which may be incorporated into the spacer structure of the present invention.
Figure 6B:
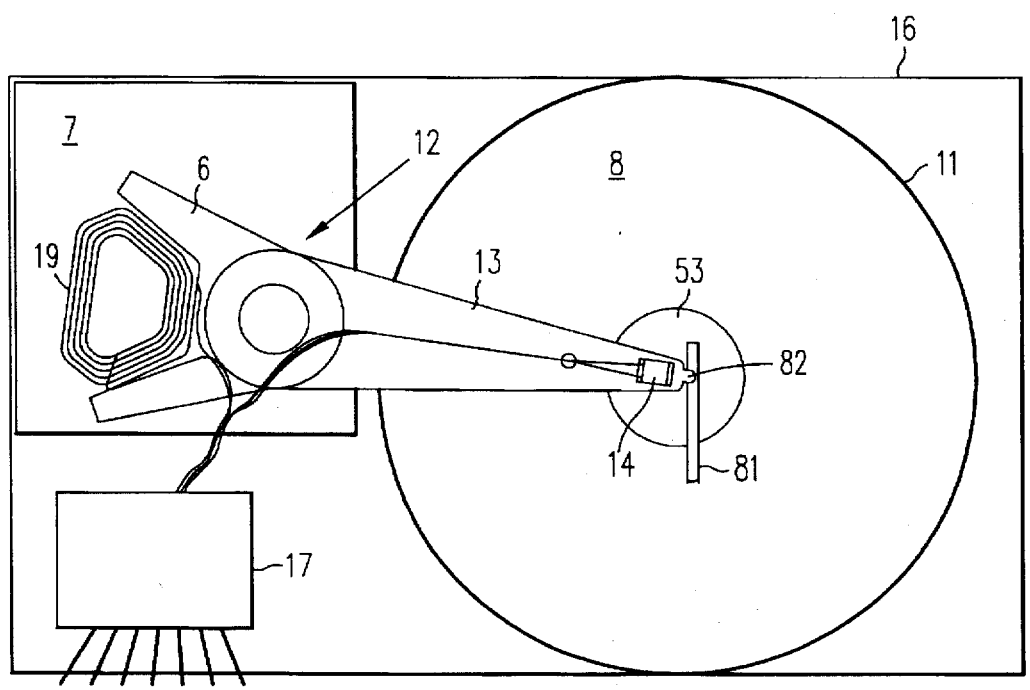
Figure 7A:
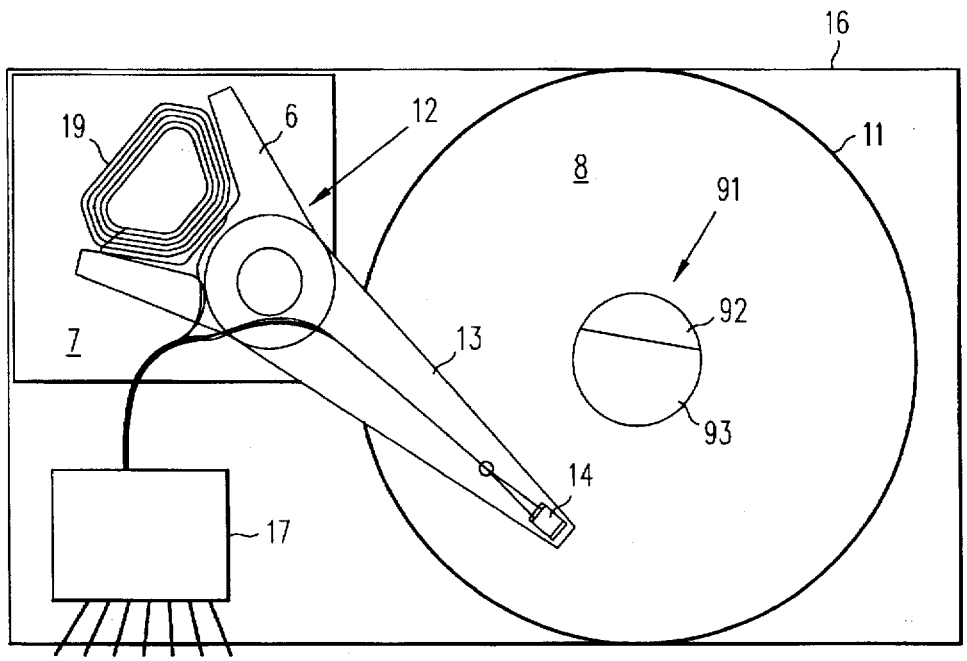
FIGS. 7A-7D are top and detailed perspective views of a spacer structure implemented in the disk drive of FIGS. 5A-5C according to the present invention.
Figure 7C:
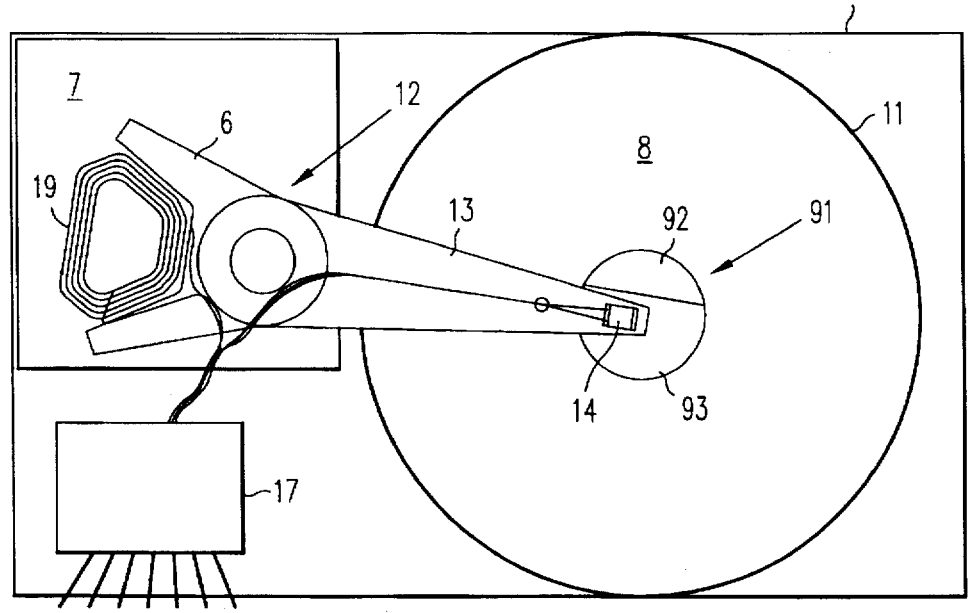
Figure 7B:
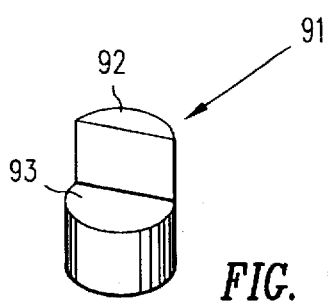
Figure 7D:
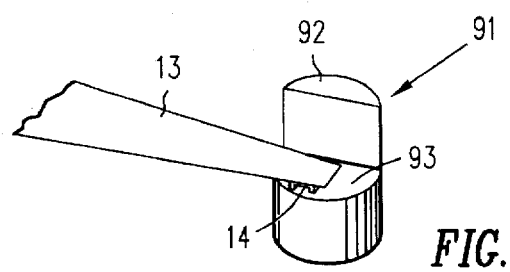

A centrally disposed load/unload ramp 81 which may be incorporated into the proposed spacer structures is shown in FIGS. 6A–6B. The suspension 13 may be adapted to engage the ramp 81, e.g. by adding a tab 82 at its tip. As the slider moves toward the center of the disk, its fly height is reduced because of the decreasing upward force of the air flow. The ramp 81 catches the suspension tab 82 before the slider encounters the disk surface 8.

The spacer structures according to the present invention are designed for contact with or rigid mounting to the housing of the disk drive over the disk, preferably directly above the disk center. A first embodiment is shown in FIGS. 7A–7D. The structure 91 includes a landing surface 93 to accommodate center parking (see FIG. 7B). Surface 92 is near or affixed to the drive housing 16 located directly above disk center. As will be readily apparent to those of ordinary skill in disk drive design, many variations of the spacer shown in FIGS. 7A–7D are possible. This parking feature, like the other proposed designs, offers the benefit of protecting the disk drive from heavy loads external to the disk enclosure, since the excess loads will be transmitted in a controlled and predictable manner to the stationary structure 51.

Figure 8A:
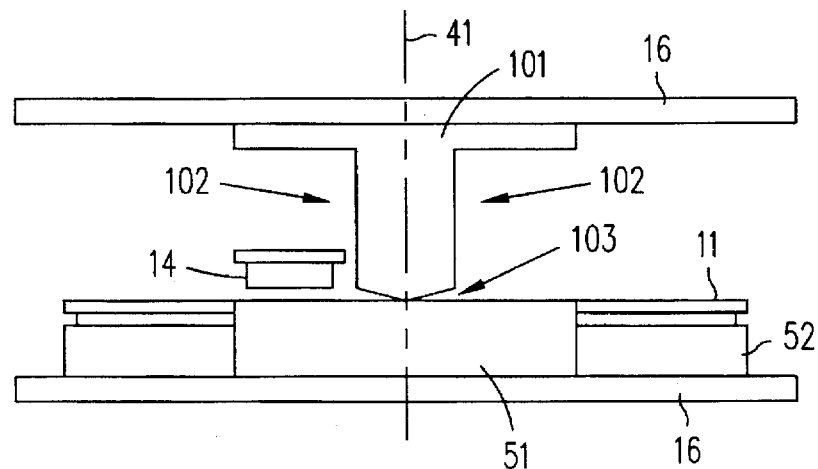
FIGS. 8A and 8B are sectional side views of a disk drive including a spacer structure according to the present invention suspended from the enclosure of a disk drive with a contact tip touching the disk center or hub, respectively.
Figure 9A:
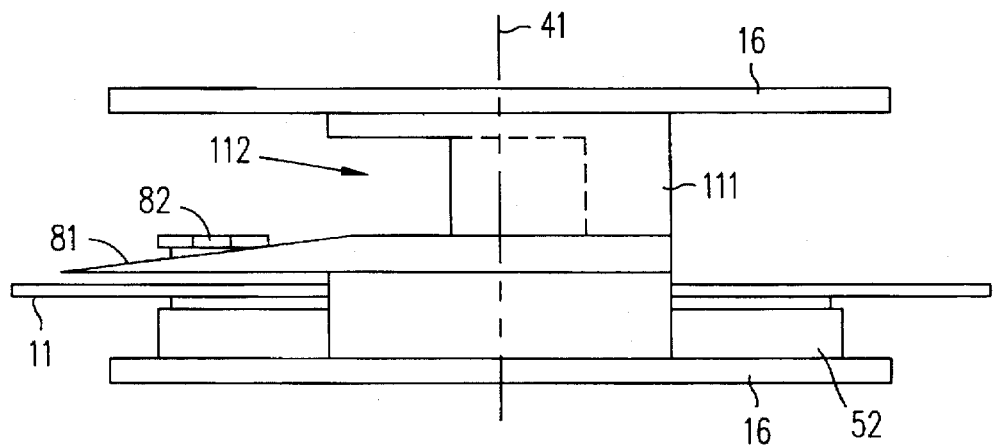
FIGS. 9A, 9B and 9C are side and top views of a disk drive including a spacer structure having a load/unload ramp according to the present invention.
Figure 9B:
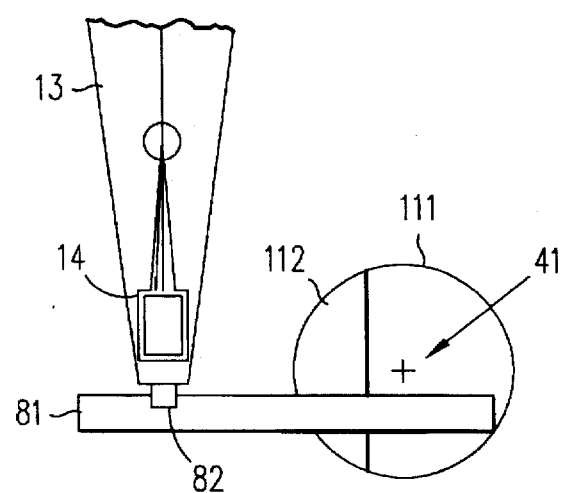
Figure 8B:
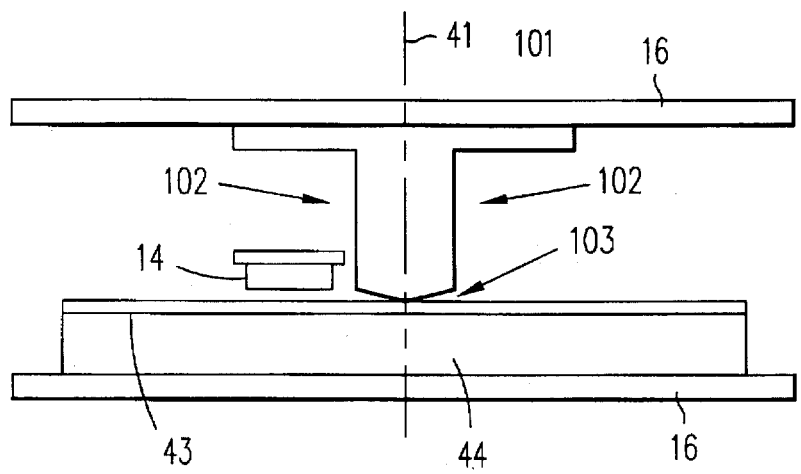
Figure 9C:
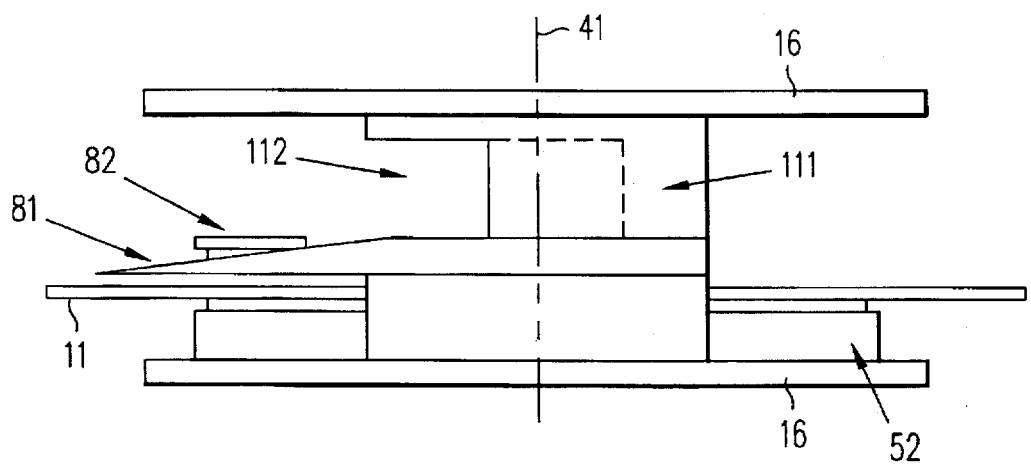

In a second embodiment, a structure 101 is suspended from the drive housing 16 above the disk 11, and is therefore suitable for embodiments of the present invention including either rotating or stationary centers as shown in FIGS. 8B and 8A, respectively. Carved out region 102 accommodates head parking proximate to the center of the disk 11. When a force is exerted on the disk housing, the structure 101 temporarily makes contact with the center region 45 or 53. If the disk center is rotating, the spacer is shaped at its base to include a cone, needle, or other appropriate shape to limit its area of disk contact. A conical base 103 is shown in FIGS. 8A and 8B. A second embodiment in this grouping is illustrated in FIGS. 9A, 9B and 9C. This embodiment comprises a load-unload ramp affixed to the housing 16. It may also be fixed to or in contact with the center region as shown in FIG. 9A.

For all embodiments of the center-parking features just described, head 14 and suspension 13 are positioned over the data recording surface of disk 11 during reading and writing of data, as shown in FIGS. 4A and 4B. During times of inactivity, the head is moved into the central region 45 or 53 so that head 14 is substantially aligned with a central axis is 41 perpendicular to the disk surface. As the slider 14 nears the inner diameter of the disk 11, the upward force of the air flow is reduced and the slider begins to drag along region 45. It is then "parked" on the center-parking structure provided at the disk center 41 or 53. The actuator assembly 12 moves the slider back onto the disk surface when necessary by applying a force to overcome the friction between slider 14 and surface of the parking structure. The slider 14 is preferably also center parked during periods when the drive is not operational.

Although the present invention has been described in terms of specific, it is to be understood that the disclosure is not to be interpreted as limited to those embodiments shown. Various further alterations and modifications will no doubt become apparent to those skilled in the art after having read the above disclosure. Moreover, the examples provided are not intended to be exhaustive, and the scope of the present invention defined by the following claims is intended to extend to all functional equivalents of the elements shown or described.

I claim:

1. A spacer structure for use with a disk drive assembly having a housing, a rotatable storage disk, and an actuator assembly for positioning a transducer relative to the disk, comprising:

a base; and a support structure extending from the base in the direction of the disk and adapted for contact with a substantially planar region at the center of the disk, the support structure including a parking structure for receiving a transducer.

2. The spacer structure of claim 1, wherein the base is adapted to make contact with a portion of the housing over the disk.

3. The spacer structure of claim 1, wherein the base is adapted for rigid mounting to the disk drive housing.

4. The spacer structure of claim 1, wherein the support structure further comprises a cone-shaped protrusion for making contact with the disk.

5. The spacer structure of claim 1, wherein the support structure further comprises a needlelike projection for making contact with the disk.

6. The spacer structure of claim 1, wherein the substantially planar region is stationary relative to the rotatable disk.

7. The spacer structure of claim 6, wherein the support structure is adapted for rigid mounting to the substantially planar region.

8. The spacer structure of claim 1, wherein the substantially planar region further comprises a coating of nonstick material.

9. The spacer structure of claim 1, wherein the substantially planar region further comprises a shock absorbing material.

10. The spacer structure of claim 1, wherein the substantially planar region is roughened.

11. The spacer structure of claim 10, wherein the substantially planar region further comprises a plurality of concentric grooves.

12. The spacer structure of claim 1, wherein the substantially planar region is smoothed.

13. The spacer structure of claim 1, wherein the parking structure further comprises a ramp.

14. The spacer structure of claim 13, wherein the ramp is adapted to engage a suspension of a disk drive actuator assembly.

15. The spacer structure of claim 1, wherein the support structure defines a recess or cavity for receiving the transducer.

16. The spacer structure of claim 15, wherein the parking structure further comprises a ramp disposed in the recess or cavity.

17. The spacer structure of claim 1, wherein the parking structure further comprises a step formed in the support structure.

18. The spacer structure of claim 17, wherein the parking structure further comprises a ramp extending from the support structure.

19. A spacer structure for use with a disk drive assembly having a housing, a rotatable storage disk, and an actuator assembly for positioning a transducer relative to the disk, comprising:

a base adapted for contact with a portion of a disk drive housing above a disk; and a support structure extending from the base in the direction of the disk, including a parking structure for receiving a transducer and a cone-shaped protrusion for making contact with the disk.

20. The spacer structure of claim 19, wherein the support structure further comprises a needlelike projection for making contact with the disk.

21. The spacer structure of claim 19, wherein the support structure makes contact with a substantially planar region at the center of the disk.

22. The spacer structure of claim 21, wherein the planar region is stationary relative to the rotatable disk.

23. The spacer structure of claim 22, wherein the support structure is adapted for rigid mounting to the stationary planar region.

24. The spacer structure of claim 21, wherein the planar region further comprises a coating of nonstick material.

25. The spacer structure of claim 21, wherein the planar region further comprises a shock absorbing material.

26. The spacer structure of claim 21, wherein the planar region is roughened.

27. The spacer structure of claim 26, wherein the roughened planar region further comprises a plurality of concentric grooves.

28. The spacer structure of claim 21, wherein the planar region is smoothed.

* * * * *